US012663991B2

(12) United States Patent (10) Patent No.: US 12,663,991 B2
Ha et al. (45) Date of Patent: Jun. 23, 2026

(54) DATA INTERFACE DEVICE OF DISPLAY APPARATUS

(71) Applicant: LG Display Co., Ltd., Seoul (KR)

(72) Inventors: Sung Chul Ha, Paju-si (KR); Jin Cheol Hong, Paju-si (KR)

(73) Assignee: LG Display Co., Ltd., Seoul (KR)

( * ) Notice: Subject to any disclaimer, the term of this patent is extended or adjusted under 35 U.S.C. 154(b) by 131 days.

(21) Appl. No.: 18/920,050

(22) Filed: Oct. 18, 2024

(65) Prior Publication Data

US 2025/0208866 A1 Jun. 26, 2025

(30) Foreign Application Priority Data

Dec. 21, 2023 (KR) ........................ 10-2023-0188186

(51) Int. Cl.
*G06F 9/30* (2018.01)
*G06F 9/50* (2006.01)
*G06F 21/60* (2013.01)
*G06F 21/72* (2013.01)

(52) U.S. Cl.
CPC ...... *G06F 9/30018* (2013.01); *G06F 9/30185* (2013.01); *G06F 9/50* (2013.01); *G06F 21/60* (2013.01); *G06F 21/72* (2013.01)

(58) Field of Classification Search
CPC .. G06F 9/30018; G06F 9/30185; G06F 21/72; G06F 21/60
See application file for complete search history.

(56) References Cited

FOREIGN PATENT DOCUMENTS

WO WO-2017029794 A1 * 2/2017 ............. H04H 60/40

* cited by examiner

*Primary Examiner* — Joseph J Lauture
(74) *Attorney, Agent, or Firm* — Fenwick & West LLP

(57) ABSTRACT

A data interface device of a display apparatus includes a transfer device including an embedded encoder configured to encode a 10-bit original data packet as an 11-bit transfer data packet to transfer the 11-bit transfer data packet and a reception device including an embedded decoder configured to the 11-bit transfer data packet, received from the transfer device through an interface circuit, as the 10-bit original data packet.

20 Claims, 15 Drawing Sheets

DIT

OTT

ITT

ENC → TX    EPI-DATA    RX → DEC

| division | embodiment |
|---|---|
| Encoding | 10b11b |
| Over Head | 9.1% |
| Max Run Length | 5 |
| Max DC Balance | 8:3 |

|  | E[10] | E[9] | E[8] | E[7] | E[6] | E[5] | E[4] | E[3] | E[2] | E[1] | E[0] |
|---|---|---|---|---|---|---|---|---|---|---|---|
| C1 → | X | A | A | A | A | A | A | X | X | X | X |
| C2 → | X | X | A | A | A | A | A | A | X | X | X |
| C3 → | X | X | X | A | A | A | A | A | A | X | X |
| C4 → | X | X | X | X | A | A | A | A | A | A | X |

Inversion of some of S[5:4]

| Original 10 bit | S[9] | S[8] | S[7] | S[6] | S[5] | S[4] | S[3] | S[2] | S[1] | S[0] |
|---|---|---|---|---|---|---|---|---|---|---|

Inversion

| Encoding 11 bit | E[10] | E[9] | E[8] | E[7] | E[6] | E[5] | E[4] | E[3] | E[2] | E[1] | E[0] |
|---|---|---|---|---|---|---|---|---|---|---|---|

(Max Run Length = 5) Middle 6 bits : continuous 1 or 0 exclusion

FIG. 11

| delimiter | E[2] = E[0] | E[2] = E[1] | E[9] = E[8] |
|-----------|-------------|-------------|-------------|
| Case1 | True (Yes) | False (No) | False (No) |
| Case2 | True (Yes) | True (Yes) | Don't Care |
| Case3 | True (Yes) | False (No) | False (No) |
| Case4 | False (No) | Don't Care | Don't Care |

S[9:7] = [000] or [111] (non-overlapping case 2)

| Original | S[9] | S[8] | S[7] | S[6] | S[5] | S[4] | S[3] | S[2] | S[1] | S[0] |
|----------|------|------|------|------|------|------|------|------|------|------|

[ Case1 ]

[ Case1 ]

S[6:3] = [0000] or [1111]   or   S[5:0] : [000000] or [111111] (non-overlapping case 1)

| | S[9] | S[8] | S[7] | S[6] | S[5] | S[4] | S[3] | S[2] | S[1] | S[0] |
|---|---|---|---|---|---|---|---|---|---|---|
| Original | S[9] | S[8] | S[7] | S[6] | S[5] | S[4] | S[3] | S[2] | S[1] | S[0] |

[ Case2 ]

[ Case2 ]

[ Case3 ]

DATA INTERFACE DEVICE OF DISPLAY APPARATUS

CROSS-REFERENCE TO RELATED APPLICATION

This application claims the benefit of the Republic of Korea Patent Application No. 10-2023-0188186 filed on Dec. 21, 2023, which is hereby incorporated by reference in its entirety.

BACKGROUND

Field of Technology

The present disclosure relates to a data interface device of a display apparatus.

Discussion of the Related Art

Recently, as needs for display apparatuses of a high-speed model increase, a high data transfer rate between a timing controller and a source driver is needed, and due to this, a data transfer error may occur.

Encoding technology which processes a transfer data packet and decoding technology which recovers transferred data to an original state have been proposed for reducing a data transfer error rate.

In an encoding condition for reducing a data transfer error rate, i) a maximum run length representing a number of repetitions of 0 or 1 should be small, and ii) a maximum direct current (DC) balance representing a relative ratio of 0 and 1 should be good. To satisfy the encoding conditions i) and ii), it is favorable to extend the number of data bits.

The encoding conditions i) and ii) have an overhead and tradeoff relationship. The overhead represents the degree to which the number of bits based on an encoding result extends more than the number of original bits. When the overhead is large, the amount of data transfer increases, and due to this, high-speed transfer is difficult and a decoding process is complicated.

SUMMARY

To overcome the aforementioned problem of the related art, the present disclosure may provide a data interface device of a display apparatus, which may be suitable for a condition of a transfer data packet for reducing a data transfer error rate and may minimize or at least reduce overhead.

To achieve these objects and other advantages and in accordance with the purpose of the disclosure, as embodied and broadly described herein, a data interface device of a display apparatus includes a transfer device including an embedded encoder configured to encode a 10-bit original data packet as an 11-bit transfer data packet to transfer the 11-bit transfer data packet and a reception device including an embedded decoder configured to the 11-bit transfer data packet, received from the transfer device through an interface circuit, as the 10-bit original data packet.

The encoder sets a case delimiter in the 11-bit transfer data packet through bit extension from the 10 bit to the 11 bits and sets, to 5, a maximum run length representing a number of repetitions of 0 or 1 in at least one transfer data packet, and the decoder decodes the 11-bit transfer data packet as the 10-bit original data packet with reference to the case delimiter.

BRIEF DESCRIPTION OF THE DRAWINGS

The accompanying drawings, which are included to provide a further understanding of the disclosure and are incorporated in and constitute a part of this application, illustrate embodiment(s) of the disclosure and together with the description serve to explain the principle of the disclosure. In the drawings:

FIGS. 7 to 12 are diagrams illustrating an encoding method for satisfying a condition of a transfer data packet according to one embodiment;

DETAILED DESCRIPTION

Figure 1:
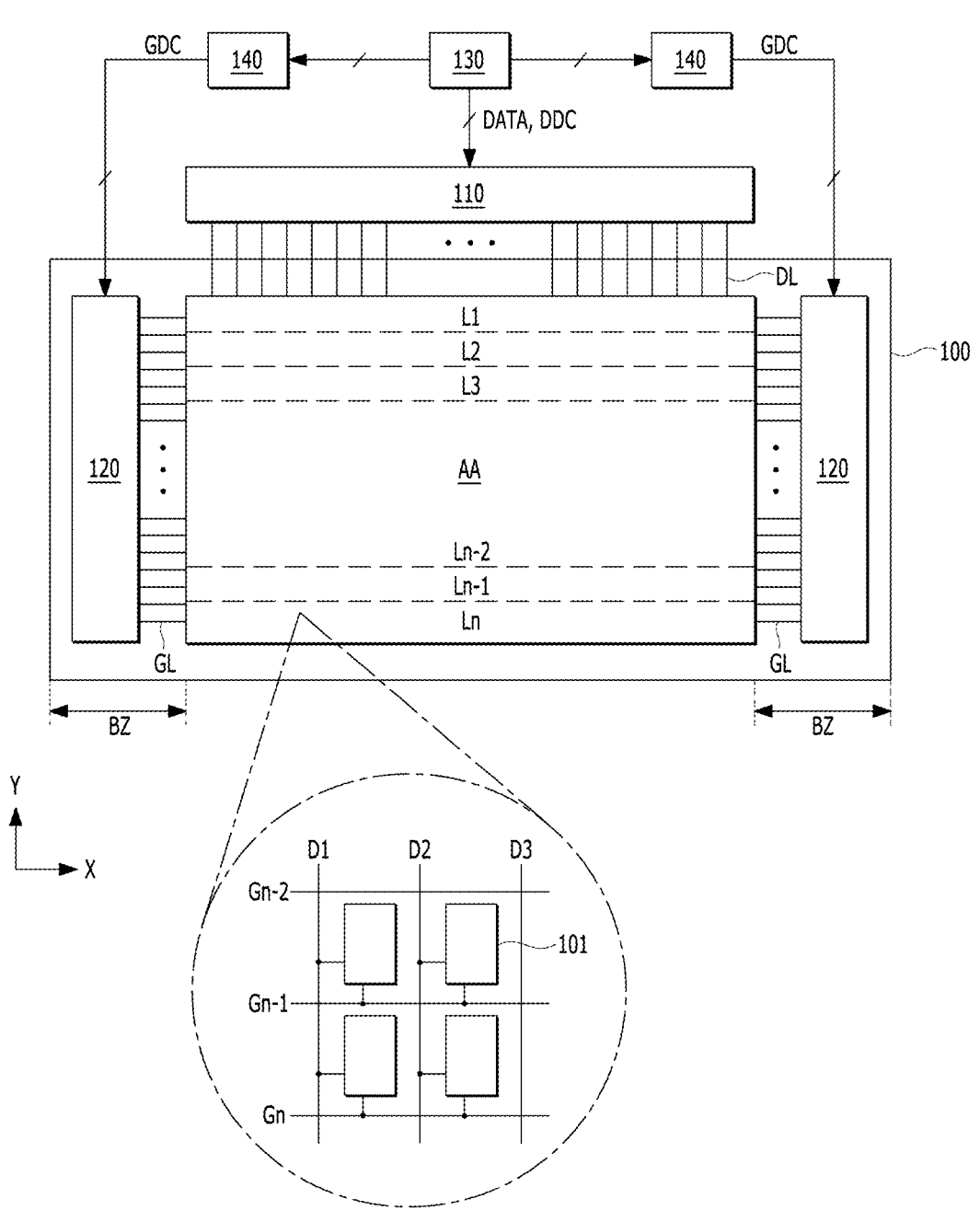
FIG. 1 is a block diagram illustrating a display apparatus according to one embodiment.

Hereinafter, the present disclosure will be described more fully with reference to the accompanying drawings, in which exemplary embodiments of the disclosure are shown. The disclosure may, however, be embodied in many different forms and should not be construed as being limited to the embodiments set forth herein; rather, these embodiments are provided so that this disclosure will be thorough and complete, and will fully convey the concept of the disclosure to those skilled in the art.

Advantages and features of the present disclosure, and implementation methods thereof will be clarified through following embodiments described with reference to the accompanying drawings. The present disclosure may, however, be embodied in different forms and should not be construed as limited to the embodiments set forth herein. Rather, these embodiments are provided so that this disclosure will be thorough and complete, and will fully convey the scope of the present disclosure to those skilled in the art. Furthermore, the present disclosure is only defined by scopes of claims.

The shapes, sizes, ratios, angles, numbers and the like disclosed in the drawings for description of various embodiments of the present disclosure to describe embodiments of the present disclosure are merely exemplary and the present disclosure is not limited thereto. Like reference numerals refer to like elements throughout. Throughout this specification, the same elements are denoted by the same reference numerals. As used herein, the terms "comprise", "having," "including" and the like suggest that other parts can be added unless the term "only" is used. As used herein, the singular forms "a", "an", and "the" are intended to include the plural forms as well, unless context clearly indicates otherwise.

Elements in various embodiments of the present disclosure are to be interpreted as including margins of error even without explicit statements.

In describing a position relationship, for example, when a position relation between two parts is described as "on~", "over~", "under~", and "next~", one or more other parts may be disposed between the two parts unless "just" or "direct" is used.

It will be understood that, although the terms "first", "second", etc. may be used herein to describe various elements, these elements should not be limited by these terms. These terms are only used to distinguish one element from another. For example, a first element could be termed a second element, and, similarly, a second element could be termed a first element, without departing from the scope of the present disclosure.

In the following description, when the detailed description of the relevant known function or configuration is determined to unnecessarily obscure the important point of the present disclosure, the detailed description will be omitted. Hereinafter, embodiments of the present disclosure will be described in detail with reference to the accompanying drawings.

Figure 2:
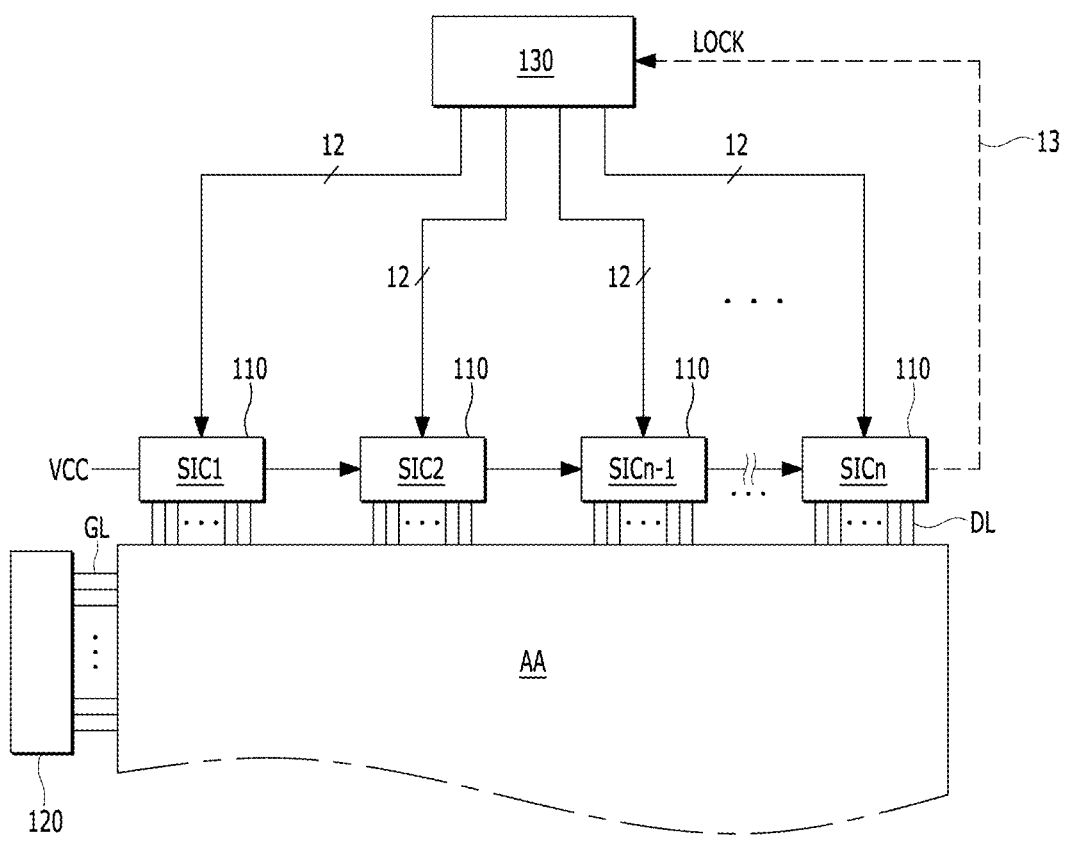
FIG. 2 is a diagram illustrating embedded clock point to point interface (EPI) topology for connecting a timing controller to source driver integrated circuits (ICs) according to one embodiment.

FIG. 1 is a block diagram illustrating a display apparatus according to one embodiment. FIG. 2 is a diagram illustrating embedded clock point to point interface (EPI) topology for connecting a timing controller to source driver integrated circuits (ICs) according to one embodiment.

Referring to FIG. 1, a display panel 100 may include a screen AA which displays an input image. The screen AA may include a pixel array which displays pixel data (hereinafter referred to as "image data") DATA of an input image. The pixel array may include a plurality of data lines DL, a plurality of gate lines GL intersecting with the data lines DL, and a plurality of pixels.

The pixels may be arranged on the screen AA in a matrix type defined by the data lines DL, the gate lines GL, and the reference voltage lines. The pixels may be arranged as various types, such as a stripe type and a diamond type as well as a matrix type, on the screen AA.

The pixel array may include a plurality of pixel columns and a plurality of pixel lines L1 to Ln intersecting with the pixel columns. Each of the pixel columns may include pixels which are arranged in a Y-axis direction. A pixel line may include pixels which are arranged in an X-axis direction. One vertical period may be one frame period needed for writing image data DATA of one frame in all pixels of the screen. One horizontal period may be a time obtained by dividing one frame period by the number of pixel lines L1 to Ln. One horizontal period may be a time needed for writing the image data DATA of one pixel line, sharing a gate line GL, in pixels of one pixel line.

Each of the pixels may include a red (R) subpixel 101, a green (G) subpixel 101, a blue (B) subpixel 101, and a white (W) subpixel 101 for implementing colors.

In an organic light emitting display apparatus, a pixel circuit may include a light emitting device, a driving element, one or more switch elements, and a capacitor. The light emitting device may be implemented as an organic light emitting diode (OLED) or an inorganic light emitting diode. A driving current which allows the light emitting device to emit light may be adjusted based on a gate-source voltage of the driving element. Each of the driving element and the switch element may be implemented as a transistor. A semiconductor layer of the transistor may include amorphous silicon or polysilicon. A semiconductor layer of at least some of transistors may include oxide. The pixel circuit may be connected to a data line DL and a gate line GL. In FIG. 1, "D1 to D3" illustrated in a circle may be data lines, and "Gn–2 to Gn" may be gate lines. Also, each of the subpixels 101 may include the same pixel circuit.

Touch sensors may be disposed on the display panel 100. The touch sensors may be arranged as an on-cell or add-on type on the screen AA of the display panel 100, or may be implemented as in-cell type touch sensors embedded in the pixel array. A touch input may be sensed through the touch sensors, or may be sensed through only pixels even without touch sensors.

A display panel driver may include a source driver 110 and a gate driver 120. The display panel driver may write image data DATA in the pixels of the display panel 100, based on control by the timing controller 130.

A source driver 110 may convert the image data DATA, received from the timing controller 130, into gamma compensation voltages by using a digital-to-analog converter (DAC) to generate data voltages. The source driver 110 may supply the data voltages to the data lines DL. The data voltages may be supplied to the data lines DL and may be applied to the driving elements through the switch elements of the subpixels 101. The source driver 110, as illustrated in FIG. 2, may be implemented with one or more source driver integrated circuits (ICs) SIC1 to SICn. Each of the source driver ICs SIC1 to SICn may further include a touch driver which generates a touch sensor driving signal and converts an electric charge variation of a touch sensor into touch original data.

A gate driver 120 may be provided in a bezel region BZ which is outside a screen and does not display an image on the display panel 100. The gate driver 120 may sequentially supply a gate signal, synchronized with data voltages, to the gate lines GL according to control by the timing controller 130. The gate signal may simultaneously activate a pixel line into which a data voltage is charged. The gate driver 120 may output the gate signal by using one or more shift registers and may shift the gate signal. The gate signal may include one or more scan signals and an emission control signal.

The timing controller 130 may receive video data DATA and a timing signal, synchronized with the video data DATA, from the host system (not shown). The timing signal may include a vertical synchronization signal Vsync, a horizontal synchronization signal Hsync, a clock signal DCLK, and a data enable signal DE. The vertical synchronization signal Vsync may define a vertical period. The horizontal synchronization signal Hsync may define a horizontal period. The data enable signal DE may define a time (i.e., a vertical active period) where the video data DATA is transferred in a vertical period. The other time, except the vertical active period, of the vertical period may be a vertical blank period. The vertical period and the horizontal period may be detected by a method of counting the data enable signal DE, and thus, the vertical synchronization signal Vsync and the horizontal synchronization signal Hsync may be omitted.

The timing controller 130 may generate a source timing control signal DDC for controlling an operation timing of the source driver 110 and a gate timing control signal GDC for controlling an operation timing of the gate driver 120, based on the timing signal Vsync, Hsync, and DE received from the host system.

The host system be one of a television (TV), a set-top box, a navigation system, a personal computer (PC), a home theater, an automotive display system, a mobile device, and a wearable device. In the mobile device and the wearable device, the source driver 110, the timing controller 130, and a level shifter 140 may be integrated into one driver IC.

The level shifter 140 may shift a logic level of the gate timing control signal GDC, output from the timing controller 130, to a gate high voltage VGH or a gate low voltage VGL to supply to the gate driver 120. A low logic voltage of the gate timing control signal GDC may be shifted to the gate low voltage VGL, and a high logic voltage of the gate timing control signal GDC may be shifted to the gate high voltage VGH.

The timing controller 130 may transfer the image data DATA to the source driver ICs SIC1 to SICn through an internal interface circuit. The internal interface circuit may be implemented as an EPI. Hereinafter, the internal interface circuit will be described as the EPI.

The EPI, as illustrated in FIG. 2, may connect the timing controller 130 to the source driver ICs SIC1 to SICn point-to-point, thereby minimizing the number of lines between the timing controller 130 to the source driver ICs SIC1 to SICn. An EPI signal including clock-embedded control data and image data DATA may be transferred through an EPI line 12, and thus, the EPI may not need separate clock lines and control lines.

A plurality of EPI lines 12 may be divided for each source driver IC and may connect the timing controller 130 to the source driver ICs SIC1 to SICn. The timing controller 130 and the source driver ICs SIC1 to SICn may be serially connected to one another through the EPI lines 12. An output signal of the timing controller 130 may be converted into a differential signal through a transferring-end buffer, and then, the differential signal may be transferred to the source driver ICs SIC1 to SICn through the EPI lines 12. The differential signal may include a non-inverted signal and an inverted signal having opposite phases. In this case, the EPI line 12 may be implemented as a line pair which includes a line through the non-inverted signal is transferred and a line through the inverted signal is transferred.

In the EPI, each of the source driver ICs SIC1 to SICn may include a clock and data recovery (CDR) generator for CDR. The timing controller 130 may add a clock training pattern (or preamble) signal to the EPI signal to transfer to the source driver ICs SIC1 to SICn, so that an output phase and a frequency of the CDR generator is locked. The CDR generator embedded in each of the source driver ICs SIC1 to SICn may recover a clock signal from the EPI signal received through the EPI line 12 to generate a multi-phase internal clock CDR CLK.

When a phase and a frequency of the internal clock CDR CLK are locked, the source driver ICs SIC1 to SICn may feedback and input a lock signal LOCK having a high logic level, indicating an output stable state, to the timing controller 130. A direct current (DC) source voltage VDD having a high logic level may be input to a lock signal input terminal of a first source driver IC SIC1. The lock signal LOCK may be sequentially transferred up to a last source driver IC SICn from the first source driver IC SIC1. Also, the lock signal LOCK may be fed back and input to the timing controller 130 through a lock feedback line 13 connected to the timing controller and the last source driver IC SICn.

In a transfer protocol of the EPI signal, the clock training pattern signal may be transferred to the source driver ICs SIC1 to SICn prior to control data and image data. The CDR generator of each of the source driver ICs SIC1 to SICn may perform a clock training operation with reference to the clock training pattern signal to recover a clock received through the EPI line 12 and may thus generate an internal clock, and when a phase and a frequency of the internal clock are stably locked, a data link with the timing controller 130 may be established.

After the data link is established, the timing controller 130 may transfer the control data and the image data to the source driver ICs SIC1 to SICn. The timing controller 130 may start to transfer the control data and the image data to the source driver ICs SIC1 to SICn through the EPI lines 12 in response to the lock signal LOCK received from the last source driver IC SICn. An output signal of the timing controller 130 may be converted into a differential signal through a transferring-end buffer of the timing controller 130 and may be transferred to the source driver ICs SIC1 to SICn through the EPI lines 12.

The source driver ICs SIC1 to SICn may sample a control data bit from the EPI signal received through the EPI line 12 at an internal clock timing and may recover the source timing control signal DDC from the sampled control data. The control data may include the source timing control signal DDC and may further include the gate timing control signal GDC.

The source driver ICs SIC1 to SICn may sample and latch image data bits from the EPI signal received through the EPI line 12, based on the internal clock timing. The source driver ICs SIC1 to SICn may convert the image data into a gamma compensation voltage to output data voltages, in response to the recovered source timing control signal DDC. The data voltages may be supplied to the pixels through the data lines DL.

Figure 3:
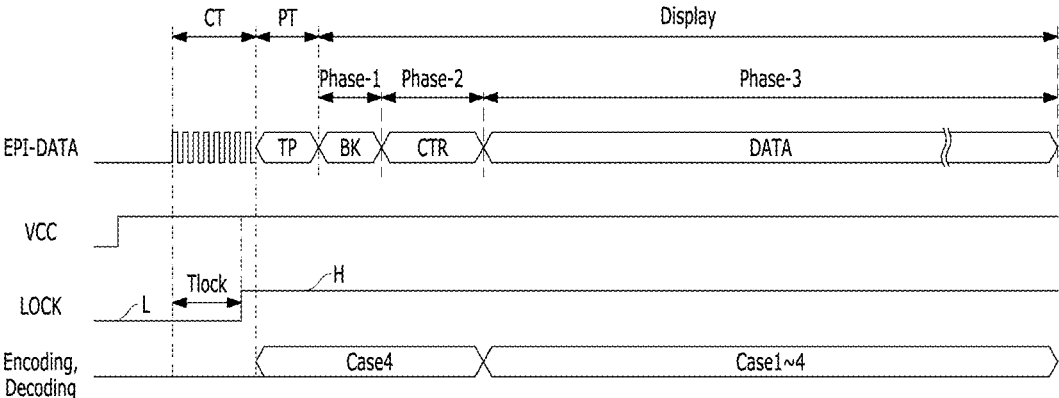
FIG. 3 is a waveform diagram showing a transfer protocol of an EPI signal according to one embodiment.

FIG. 3 is a waveform diagram showing a transfer protocol of an EPI signal according to one embodiment.

Referring to FIGS. 2 and 3, a unit transfer protocol of an EPI signal EPI DATA may include a clock training period CT, a packet training period PT, a first period Phase-1, a second period Phase-2, and a third period Phase-3, which are arranged in time sequence.

In the clock training period CT, the timing controller 130 may transfer a clock training pattern signal (or a preamble signal) having a certain frequency to the source driver ICs SIC1 to SICn through the EPI lines 12.

In the clock training period CT, when a lock signal LOCK having a high logic level (or 1) is input from the source driver IC SICn through the lock feedback line 13, the timing controller 130 may sequentially execute the packet training period PT, the first period Phase-1, and the second period Phase-2 to transfer an EPI signal in a signal format defined in a transfer protocol.

In the packet training period PT, the timing controller 130 may transfer a training packet TP to the source driver ICs SIC1 to SICn through the EPI lines 12.

In the first period Phase-1, the timing controller 130 may transfer a blank packet BK to the source driver ICs SIC1 to SICn through the EPI lines 12.

In the second period Phase-2, the timing controller 130 may transfer a control data packet CTR to the source driver ICs SIC1 to SICn through the EPI lines 12.

When the lock signal LOCK is maintained at a high logic level, the timing controller 130 may transfer an image data packet DATA to the source driver ICs SIC1 to SICn in the third period Phase-3 after the second period Phase-2.

The timing controller 130 may scramble image data of the image data packet so as to reduce electromagnetic interference (EMI) in the EPI line 12. The timing controller 130 may encode a transfer data packet unlike an original state, so as to reduce a data transfer error rate. Accordingly, the source driver ICs SIC1 to SICn may decode the transfer data packet to recover to an original state.

A transfer data packet to be encoded and decoded may include the image data packet DATA, and moreover, may further include the training packet TP, the blank packet BK, and the control data packet CTR.

An encoding operation and a decoding operation according to the present embodiment may be implemented through four different case delimiters. One of first to fourth case delimiters may be set in the transfer data packet in a process of encoding the image data packet DATA as the transfer data packet. Also, as a decoding operation is performed with reference to a case delimiter set in the transfer data packet, the image data packet DATA may be recovered.

On the other hand, the fourth case delimiter may be set in the transfer data packet in a process of encoding each of the training packet TP, the blank packet BK, and the control data packet CTR as the transfer data packet. The fourth case delimiter may need a decoding operation of a load which is relatively less than the first to third case delimiters. A decoding operation may be performed with reference to the fourth case delimiter set in the transfer data packet, and thus, the training packet TP, the blank packet BK, and the control data packet CTR may be recovered.

Comparing with the image data packet DATA, because an encoding operation and a decoding operation on the training packet TP, the blank packet BK, and the control data packet CTR are relatively simple, a data transfer error rate may be low. This may be because an encoding operation and a decoding operation on the training packet TP, the blank packet BK, and the control data packet CTR are based on the fourth case delimiter. In describing the following embodiments, the first to fourth case delimiters will be described below in detail.

In FIG. 3, "Tlock" may be a time until a lock signal is inverted from a low logic level L to a high logic level H. The clock training pattern signal may be input to the source driver ICs SIC1 to SICn for a time Tlock, and thus, a phase and a frequency of an internal clock output from the CDR generator of each of the source driver ICs SIC1 to SICn may be locked and the lock signal LOCK may be inverted to a high logic level H. The time Tlock may be a time which is greater than or equal to one horizontal period.

Figures 4, 5:
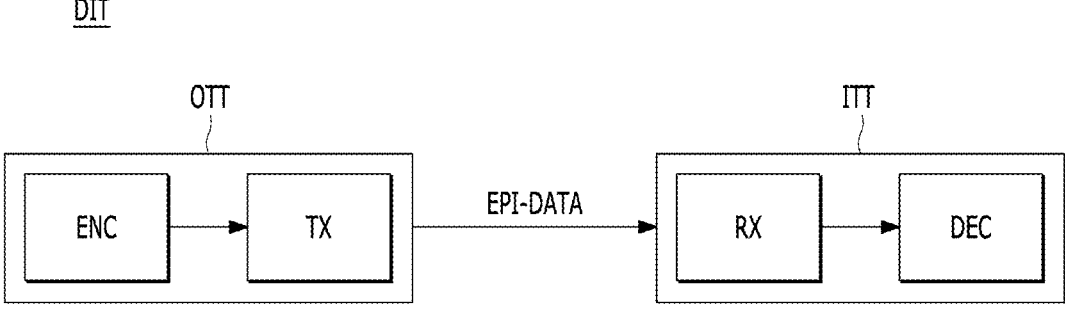
FIG. 4 is a diagram illustrating a data interface device of a display apparatus according to one embodiment.
FIG. 5 is a diagram illustrating encoding technology according to the present embodiment which may be suitable for a condition of a transfer data packet for reducing a data transfer error rate and may minimize overhead according to one embodiment.
Figure 6:
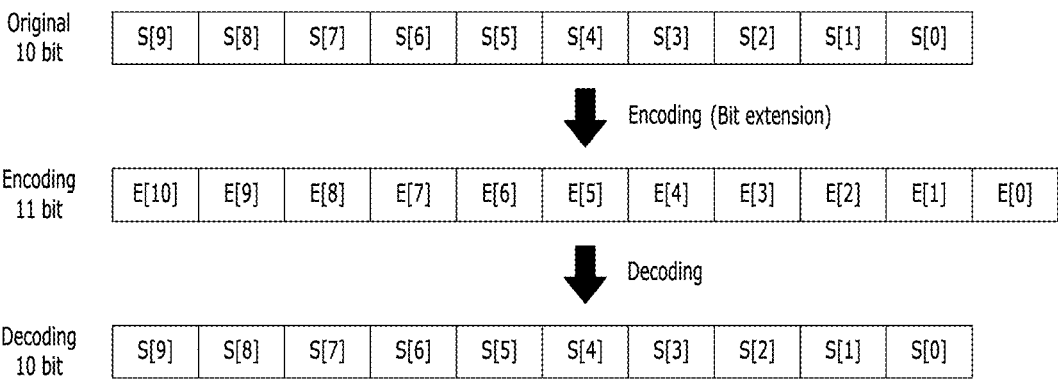
FIG. 6 is a diagram illustrating an example where 10-bit original data is extended to 11 bits through encoding and is then recovered to 10 bits through decoding, so as to minimize overhead according to one embodiment.

FIG. 4 is a diagram illustrating a data interface device of a display apparatus according to one embodiment. FIG. 5 is a diagram illustrating encoding technology according to one embodiment which may be suitable for a condition of a transfer data packet for reducing a data transfer error rate and may minimize or at least reduce overhead. FIG. 6 is a diagram illustrating an example where 10-bit original data is extended to 11 bits through encoding and is then recovered to 10 bits through decoding, so as to minimize or at least reduce overhead.

Referring to FIGS. 4 to 6, a data interface device DIT of a display apparatus according to the present embodiment may include a transfer device OTT and a reception device ITT, which are connected to each other through an EPI.

The transfer device OTT may be the timing controller 130 of FIG. 1. The transfer device OTT may include an encoder ENC and a transferor TX. The encoder ENC may encode an original data packet S[9:0] as a transfer data packet E[10:0] through bit extension. The transferor TX may transfer an encoded transfer data packet E[10:0] to the reception device ITT through the EPI.

To minimize overhead and satisfy a condition of a transfer data packet for lowering a data transfer error rate, the encoder ENC according to the present embodiment i) may encode a 10-bit original data package S[9:0] as an 11-bit transfer data packet E[10:0] to decrease overhead to 9.1(1/11)% and ii) may set, to 5, a maximum run length (Max Run Length) representing a number of repetitions of 0 or 1 in one or more transfer data packets E[10:0]. The maximum run length (Max Run Length) may be set to 5 in one transfer data packet E[10:0], and moreover, may be set to 5 in a continuous stream between two adjacent transfer data packets E[10:0]. The maximum run length (Max Run Length) being 5 may denote that a run length (Run Length) avoids 6 or more and is set to only 5 or less.

Furthermore, the encoder ENC according to the present embodiment may set, to 8:3, a maximum DC balance representing a relative ratio of 0 and 1 in the 11-bit transfer data packet E[10:0]. The maximum DC balance being 8:3 may denote that a DC balance avoids 11:0, 10:1, and 9:2 and is set to 8:3 or less. When the DC balance is 6:5, the DC balance may be relatively best.

The encoder ENC according to the present embodiment may set a case delimiter in the 11-bit transfer data packet E[10:0], based on bit extension from the 10 bits to the 11 bits. The case delimiter may be for dividing four cases described below.

The reception device ITT may be one of the source driver ICs SIC1 to SICn of FIG. 1. The reception device ITT may include a decoder DEC and a receiver RX. The receiver RX may be connected to the transferor TX of the transfer device OTT through the EPI. The receiver RX may receive the 11-bit transfer data packet E[10:0] from the transferor TX of the transfer device OTT through the EPI. The decoder DEC may decode and recover the 11-bit transfer data packet E[10:0] as the 10-bit original data package S[9:0] so as to be suitable for a corresponding case, with reference to the case delimiter set in the 11-bit transfer data packet E[10:0].

FIGS. 7 to 12 are diagrams illustrating an encoding method for satisfying a condition of a transfer data packet according to one embodiment.

The encoder ENC according to the present embodiment may encode the 10-bit original data packet S[9:0] as the 11-bit transfer data packet E[10:0] through bit extension. At this time, in order to satisfy a condition where the maximum run length is 5, the encoder ENC may perform encoding so that each of upper 3 bits E[10:8] and lower 4 bits E[3:0] is not continuous 0 or 1, in the 11-bit transfer data packet E[10:0]. Also, the encoder ENC may perform encoding so that middle 6 bits included in the transfer data packet E[10:0] are not continuous 0 or 1.

Figure 7:
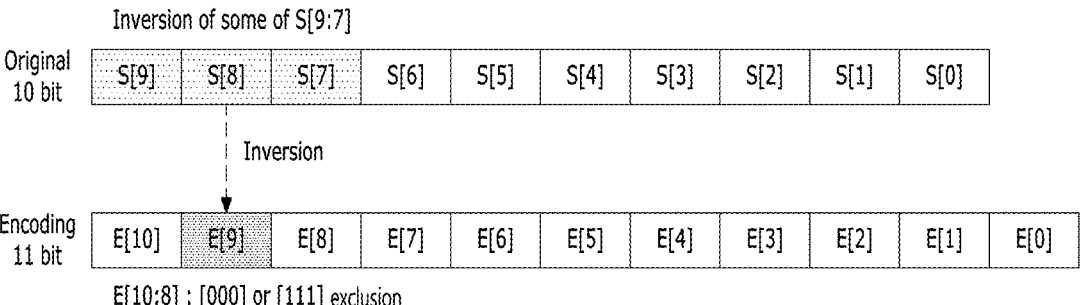

For example, as in FIG. 7, the encoder ENC according to the present embodiment may invert some S[8] of upper 3 bits S[9:7] of the original data packet S[9:0] to encode as E[9], so that upper 3 bits E[10:8] of the 11-bit transfer data packet E[10:0] are not encoded as or [111]. Here, "inversion" may denote being shifted from 0 to 1 or from 1 to 0.

Figure 8:
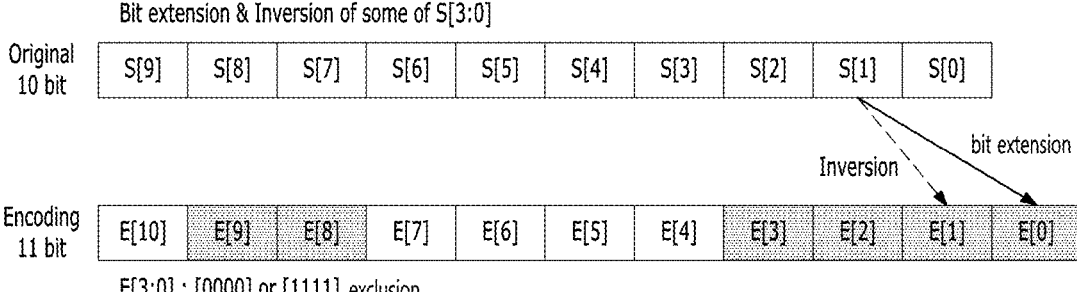

Moreover, as in FIG. 8, the encoder ENC according to the present embodiment may invert and bit-extend some of lower 4 bits S[3:0] of the original data packet S[9:0] to encode as E[1:0], so that lower 4 bits S[3:0] of the 11-bit transfer data packet E[10:0] are not encoded as or [1111].

Figures 9, 10:
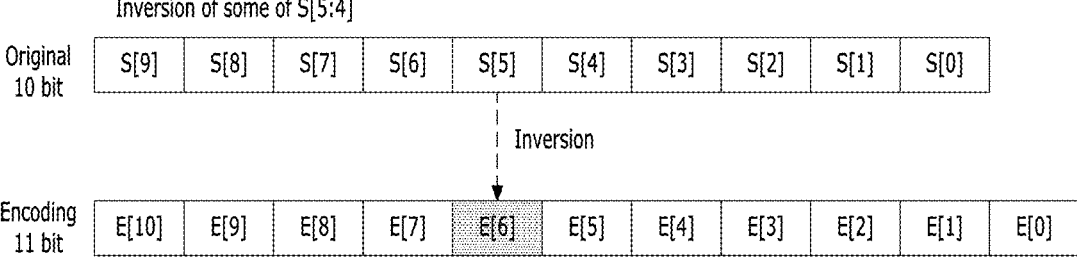
Figure 12:
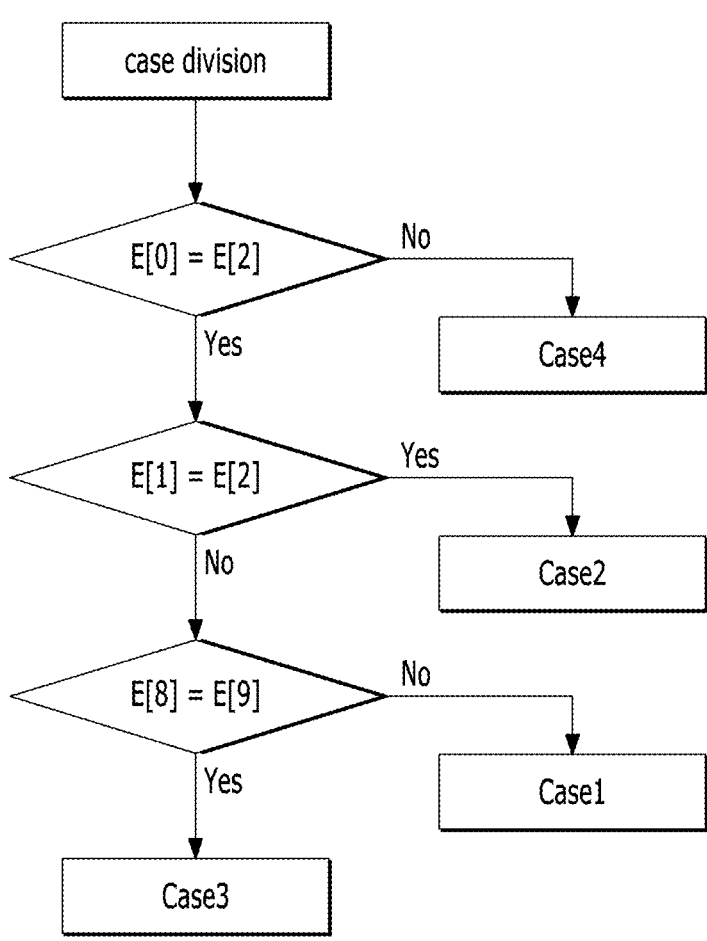

Moreover, as in FIG. 10, the encoder ENC according to the present embodiment may invert some of middle bits S[5:4] of the original data packet S[9:0] to encode as E[6], so that middle 6 bits included in the 11-bit transfer data packet E[10:0] are not encoded as continuous [000000] or [111111]. Here, the middle 6 bits may denote bits which overlap at least one of some of upper 3 bits S[10:8] and some of lower 4 bits E[3:0] included in the transfer data packet E[10:0]. Middle 6 bits included in the 11-bit transfer data packet E[10:0] are illustrated as, for example, C1, C2, C3, and C4 of FIG. 9. In FIG. 9, middle 6 bits may include, for example, overlap bits E[6:4] in common.

The encoder ENC according to the present embodiment may encode at least some of upper 3 bits S[10:8] and at least some of lower 4 bits E[3:0] as a case delimiter, in the 11-bit transfer data packet E[10:0].

The encoder ENC may set a first case delimiter in the transfer data packet E[10:0], based on a first case where upper 3 bits S[9:7] of the original data packet S[9:0] are continuous 0 or 1. The first case delimiter, as in FIGS. 11 and 12, may be E[0]=E[2], E[1]≠E[2], and E[8]≠E[9].

The encoder ENC may set a second case delimiter in the transfer data packet E[10:0], based on a second case where one of middle 4 bits S[6:3] and middle and lower 6 bits S[5:0] of the original data packet S[9:0] is continuous 0 or 1 instead of the first case. The second case delimiter, as in FIGS. 11 and 12, may be E[0]=E[2] and E[1]=[2].

The encoder ENC may set a third case delimiter in the transfer data packet E[10:0], based on a third case including all of the first case and the second case. The third case delimiter, as in FIGS. 11 and 12, may be E[0]=E[2], E[1]/E[2], and E[8]=E[9].

The encoder ENC may set a fourth case delimiter in the transfer data packet E[10:0], based on a fourth case where all of the first case, the second case, and the third case are excluded. The fourth case delimiter, as in FIGS. 11 and 12, may be E[0] E[2].

Figure 13:
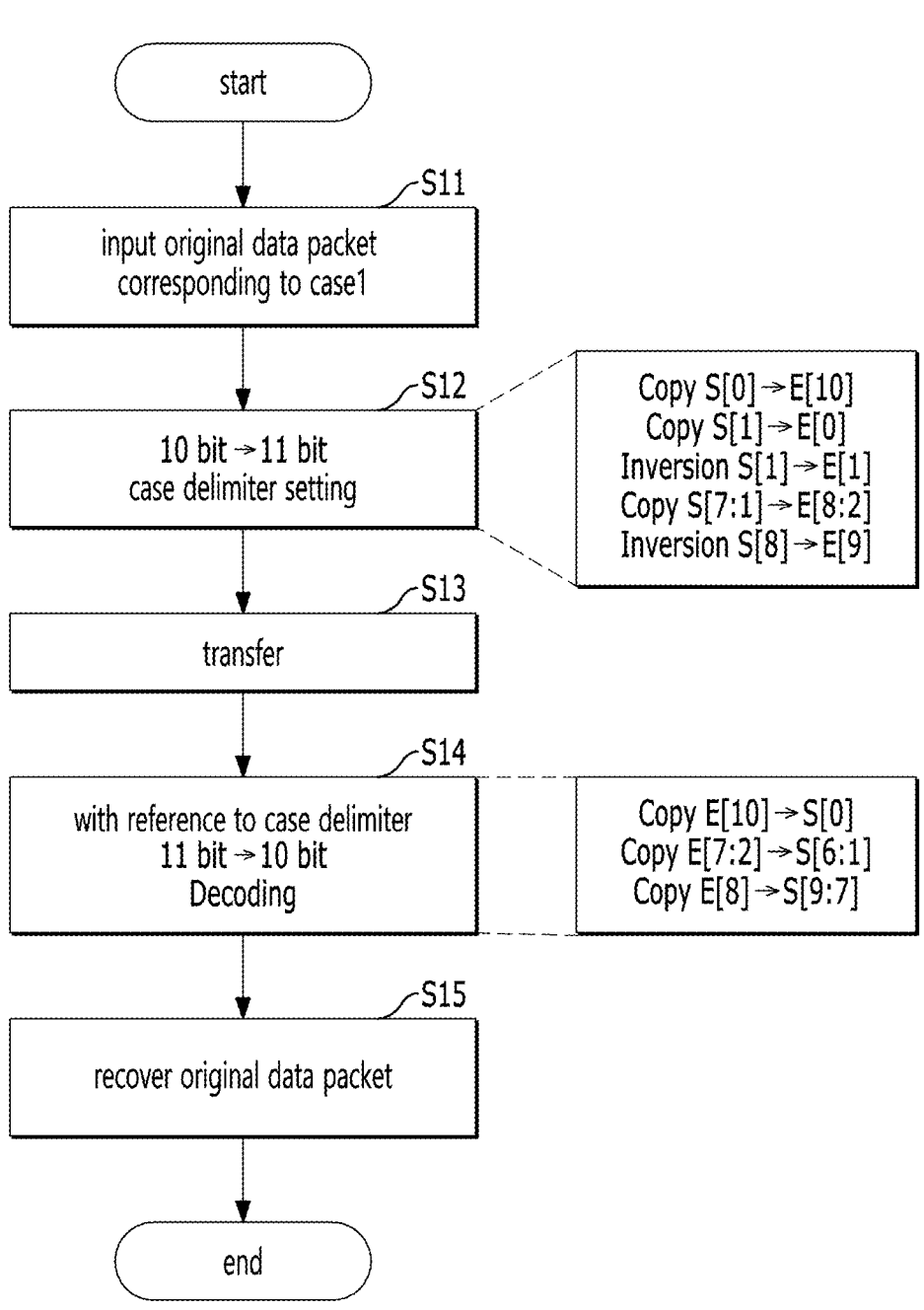
FIGS. 13 to 15 are diagrams illustrating an encoding and decoding method corresponding to a first case according to one embodiment.
Figures 14, 15:
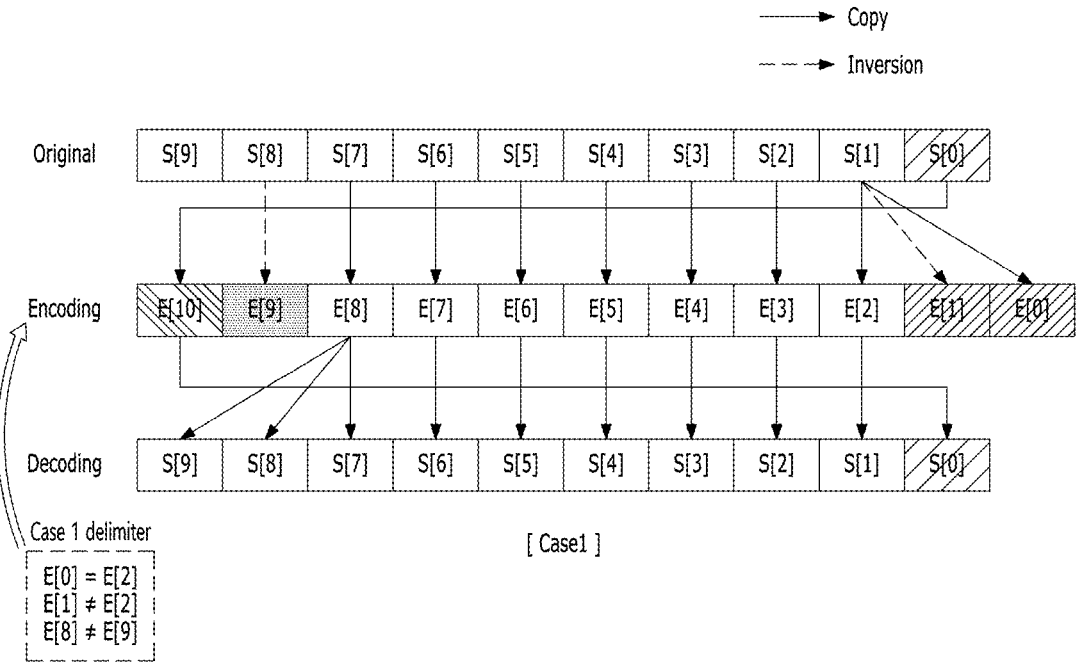

FIGS. 13 to 15 are diagrams illustrating an encoding and decoding method corresponding to a first case according to one embodiment.

Referring to FIGS. 13 to 15, the first case may correspond to a case where upper 3 bits S[9:7] of an original data packet S[9:0] are continuous 0 or 1.

When the original data packet S[9:0] corresponding to the first case is input, the encoder ENC according to the present embodiment may encode a 10-bit original data packet S[9:0] as an 11-bit transfer data packet E[10:0] through bit extension (S11 and S12).

In detail, the encoder ENC according to the present embodiment may copy S[0] of the original data packet S[9:0] to encode as E[10] of the transfer data packet E[10:0], copy S[1] of the original data packet S[9:0] to encode as E[0] of the transfer data packet E[10:0], invert S[1] of the original data packet S[9:0] to encode as E[1] of the transfer data packet E[10:0], copy S[7:1] of the original data packet S[9:0] to encode as E[8:2] of the transfer data packet E[10:0], and invert S[8] of the original data packet S[9:0] to encode as E[9] of the transfer data packet E[10:0]. Accordingly, a first case delimiter encoded in the transfer data packet E[10:0] may correspond to E[0]=E[2], E[1]/E[2], and E[8] E[9].

The encoder ENC according to the present embodiment may transfer the transfer data packet E[10:0], in which the first case delimiter is encoded, to the decoder DEC through the EPI (S13).

The decoder DEC according to the present embodiment may decode the 11-bit transfer data packet E[10:0] with reference to the first case delimiter to recover the 10-bit original data packet S[9:0] (S14 and S15).

In detail, the decoder DEC according to the present embodiment may copy E[10] of the transfer data packet E[10:0] to decode as S[0] of the original data packet S[9:0], copy E[7:2] of the transfer data packet E[10:0] to decode as S[6:1] of the original data packet S[9:0], and copy E[8] of the transfer data packet E[10:0] to decode as S[9:7] of the original data packet S[9:0], with reference to the first case delimiter.

Figure 16:
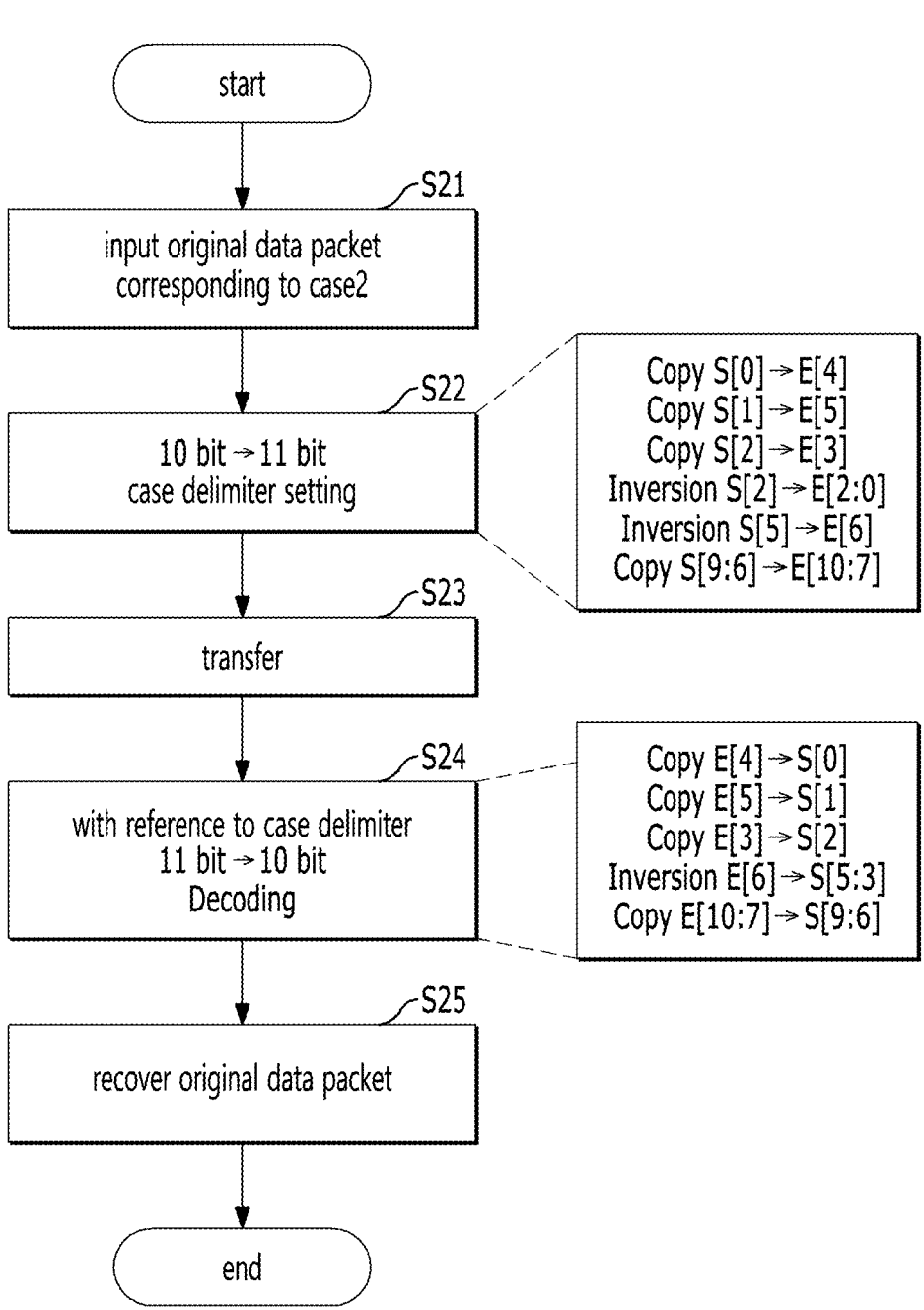
FIGS. 16 to 18 are diagrams illustrating an encoding and decoding method corresponding to a second case according to one embodiment.
Figures 17, 18:
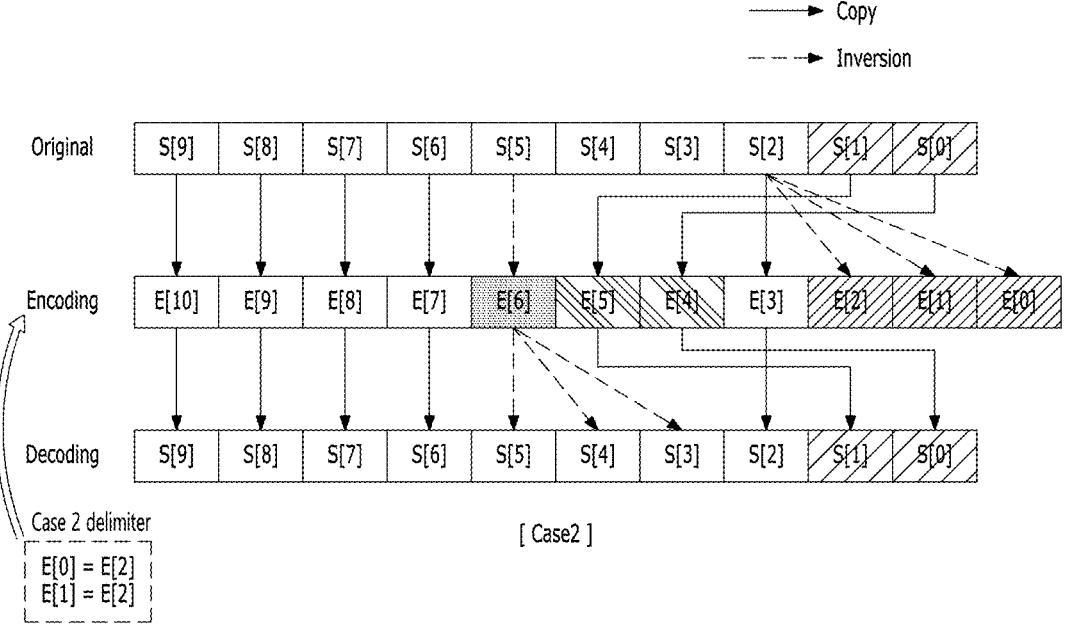

FIGS. 16 to 18 are diagrams illustrating an encoding and decoding method corresponding to a second case according to one embodiment.

Referring to FIGS. 16 to 18, the second case may not be the first case and may correspond to a case where one of middle 4 bits S[6:3] and middle and lower 6 bits S[5:0] of an original data packet S[9:0] is continuous 0 or 1.

When the original data packet S[9:0] corresponding to the second case is input, the encoder ENC according to the present embodiment may encode a 10-bit original data packet S[9:0] as an 11-bit transfer data packet E[10:0] through bit extension (S21 and S22).

In detail, the encoder ENC according to the present embodiment may copy S[0] of the original data packet S[9:0] to encode as E[4] of the transfer data packet E[10:0], copy S[1] of the original data packet S[9:0] to encode as E[5] of the transfer data packet E[10:0], copy S[2] of the original data packet S[9:0] to encode as E[3] of the transfer data packet E[10:0], invert S[2] of the original data packet S[9:0] to encode as E[2:0] of the transfer data packet E[10:0], invert S[5] of the original data packet S[9:0] to encode as E[6] of the transfer data packet E[10:0], and copy S[9:6] of the original data packet S[9:0] to encode as E[10:7] of the transfer data packet E[10:0]. Accordingly, a second case delimiter encoded in the transfer data packet E[10:0] may correspond to E[0]=E[2] and E[1]=[2].

The encoder ENC according to the present embodiment may transfer the transfer data packet E[10:0], in which the second case delimiter is encoded, to the decoder DEC through the EPI (S23).

The decoder DEC according to the present embodiment may decode the 11-bit transfer data packet E[10:0] with reference to the second case delimiter to recover the 10-bit original data packet S[9:0] (S24 and S25).

In detail, the decoder DEC according to the present embodiment may copy E[4] of the transfer data packet E[10:0] to decode as S[0] of the original data packet S[9:0], copy E[5] of the transfer data packet E[10:0] to decode as S[1] of the original data packet S[9:0], copy E[3] of the transfer data packet E[10:0] to decode as S[2] of the original data packet S[9:0], invert E[6] of the transfer data packet E[10:0] to decode as S[5:3] of the original data packet S[9:0], and copy E[10:7] of the transfer data packet E[10:0] to decode as S[9:6] of the original data packet S[9:0], with reference to the second case delimiter.

Figure 19:
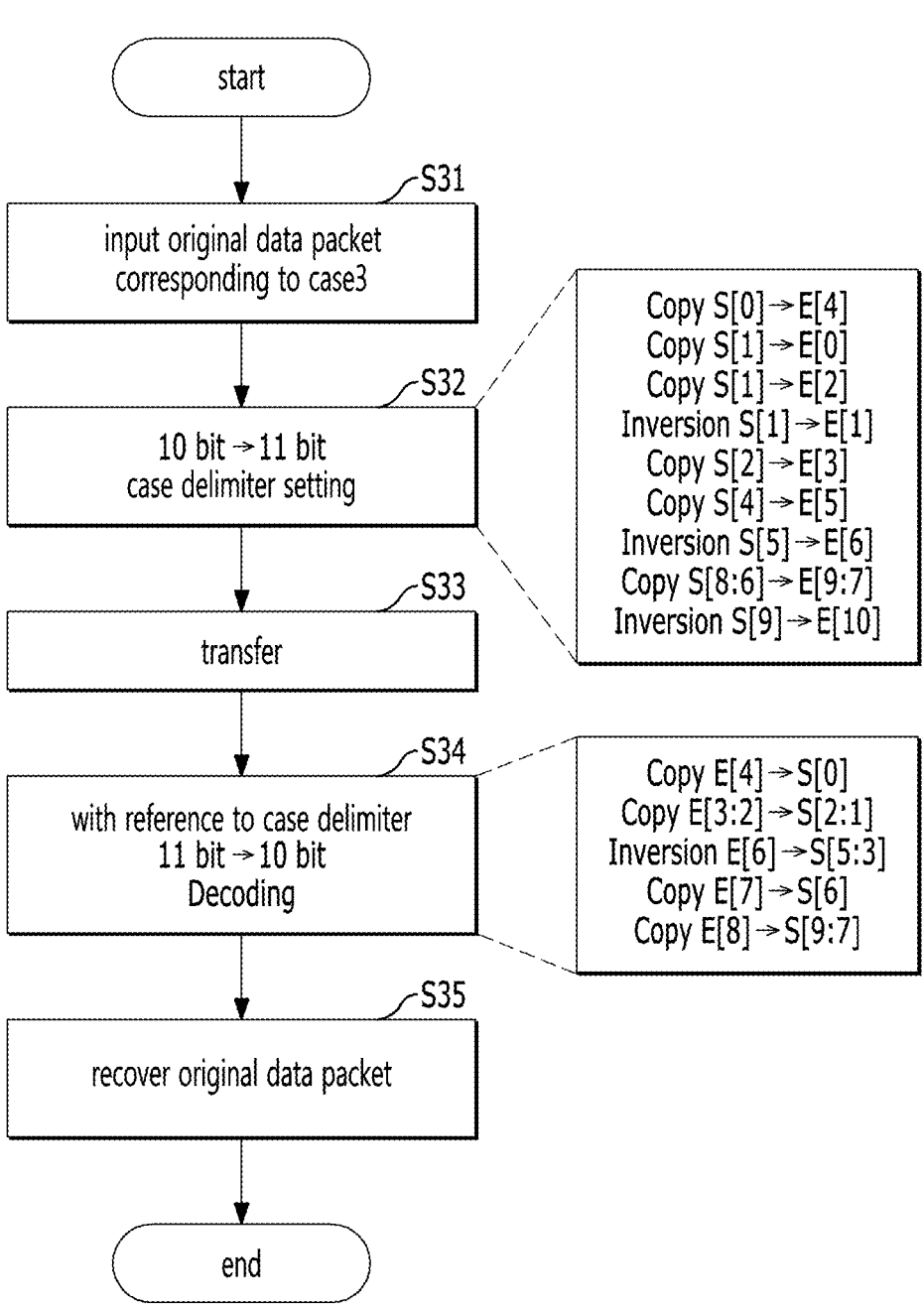
FIGS. 19 to 21 are diagrams illustrating an encoding and decoding method corresponding to a third case according to one embodiment.
Figure 20:
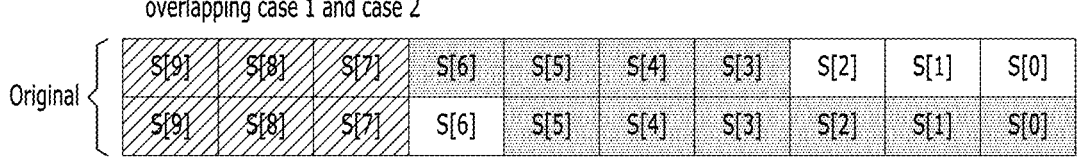
Figure 21:
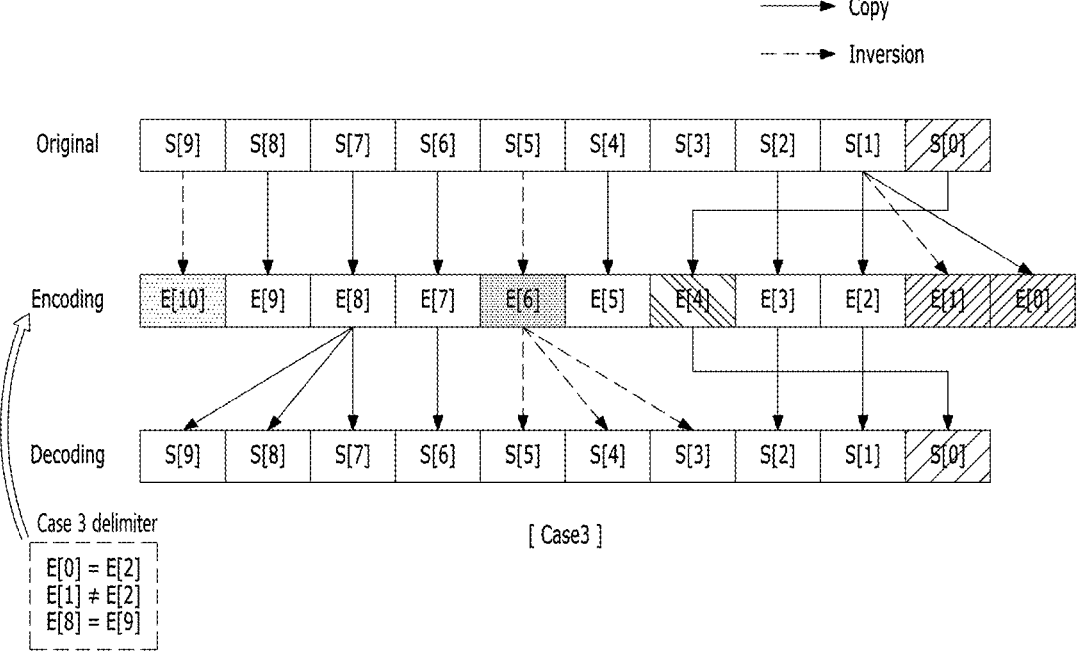

FIGS. 19 to 21 are diagrams illustrating an encoding and decoding method corresponding to a third case according to one embodiment.

Referring to FIGS. 19 to 21, the third case may correspond to a case which includes all of the first case and the second case.

When an original data packet S[9:0] corresponding to the third case is input, the encoder ENC according to the present embodiment may encode a 10-bit original data packet S[9:0] as an 11-bit transfer data packet E[10:0] through bit extension (S31 and S32).

In detail, the encoder ENC according to the present embodiment may copy S[0] of the original data packet S[9:0] to encode as E[4] of the transfer data packet E[10:0], copy S[1] of the original data packet S[9:0] to encode as E[0] of the transfer data packet E[10:0], invert S[1] of the original data packet S[9:0] to encode as E[1] of the transfer data packet E[10:0], copy S[1] of the original data packet S[9:0] to encode as E[2] of the transfer data packet E[10:0], copy S[2] of the original data packet S[9:0] to encode as E[3] of the transfer data packet E[10:0], copy S[4] of the original data packet S[9:0] to encode as E[5] of the transfer data packet E[10:0], invert S[5] of the original data packet S[9:0] to encode as E[6] of the transfer data packet E[10:0], copy S[8:6] of the original data packet S[9:0] to encode as E[9:7] of the transfer data packet E[10:0], and invert S[9] of the original data packet S[9:0] to encode as E[10] of the transfer data packet E[10:0]. Accordingly, a third case delimiter encoded in the transfer data packet E[10:0] may correspond to E[0]=E[2], E[1] E[2], and E[8]=E[9].

The encoder ENC according to the present embodiment may transfer the transfer data packet E[10:0], in which the third case delimiter is encoded, to the decoder DEC through the EPI (S33).

The decoder DEC according to the present embodiment may decode the 11-bit transfer data packet E[10:0] with reference to the third case delimiter to recover the 10-bit original data packet S[9:0] (S34 and S35).

In detail, the decoder DEC according to the present embodiment may copy E[4] of the transfer data packet E[10:0] to decode as S[0] of the original data packet S[9:0], copy E[3:2] of the transfer data packet E[10:0] to decode as S[2:1] of the original data packet S[9:0], invert E[6] of the transfer data packet E[10:0] to decode as S[5:3] of the original data packet S[9:0], copy E[7] of the transfer data packet E[10:0] to decode as S[6] of the original data packet S[9:0], and copy E[8] of the transfer data packet E[10:0] to decode as S[9:7] of the original data packet S[9:0], with reference to the third case delimiter.

Figure 22:
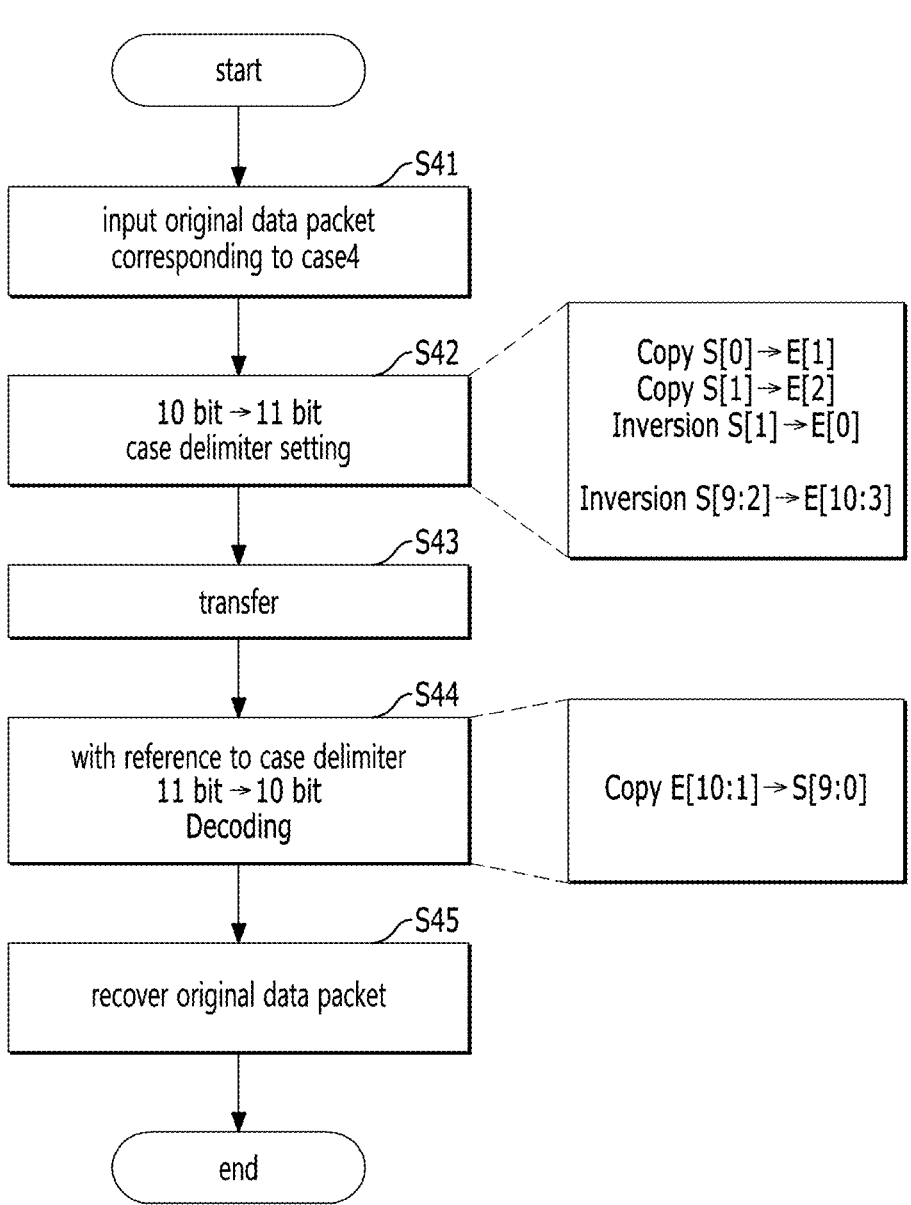
FIGS. 22 and 23 are diagrams illustrating an encoding and decoding method corresponding to a fourth case according to one embodiment.
Figure 23:
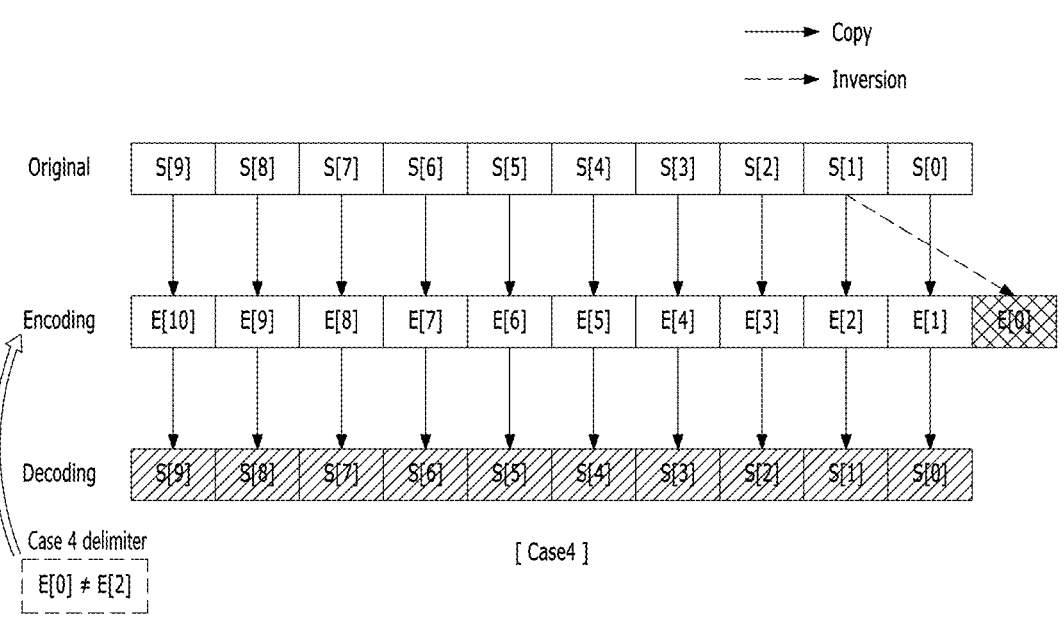

FIGS. 22 and 23 are diagrams illustrating an encoding and decoding method corresponding to a fourth case according to one embodiment.

Referring to FIGS. 22 and 23, the fourth case may correspond to a case which all of the first to third cases are excluded.

When an original data packet S[9:0] corresponding to the fourth case is input, the encoder ENC according to the present embodiment may encode a 10-bit original data packet S[9:0] as an 11-bit transfer data packet E[10:0] through bit extension (S41 and S42).

In detail, the encoder ENC according to the present embodiment may copy S[0] of the original data packet S[9:0] to encode as E[1] of the transfer data packet E[10:0], copy S[1] of the original data packet S[9:0] to encode as E[2] of the transfer data packet E[10:0], invert S[1] of the original data packet S[9:0] to encode as E[0] of the transfer data packet E[10:0], and copy S[9:2] of the original data packet S[9:0] to encode as E[10:3] of the transfer data packet E[10:0]. Accordingly, a fourth case delimiter encoded in the transfer data packet E[10:0] may correspond to E[0]≠E[2].

The encoder ENC according to the present embodiment may transfer the transfer data packet E[10:0], in which the fourth case delimiter is encoded, to the decoder DEC through the EPI (S43).

The decoder DEC according to the present embodiment may decode the 11-bit transfer data packet E[10:0] with reference to the fourth case delimiter to recover the 10-bit original data packet S[9:0] (S44 and S45).

In detail, the decoder DEC according to the present embodiment may copy E[10:1] of the transfer data packet E[10:0] to decode as S[9:0] of the original data packet S[9:0], with reference to the fourth case delimiter.

The present embodiment may realize the following effects.

The present embodiment may be suitable for a condition of a transfer data packet for reducing a data transfer error rate and may minimize or at least reduce overhead.

According to the present embodiment, a decoder structure may be simplified, and thus, a chip size may be easily reduced.

The effects according to the present disclosure are not limited to the above examples, and other various effects may be included in the specification.

While the present disclosure has been particularly shown and described with reference to exemplary embodiments thereof, it will be understood by those of ordinary skill in the art that various changes in form and details may be made therein without departing from the spirit and scope of the present disclosure as defined by the following claims.

What is claimed is:

1. A data interface device of a display apparatus, the data interface device comprising:

a transfer device including an embedded encoder configured to encode a 10-bit original data packet as an 11-bit transfer data packet to transfer the 11-bit transfer data packet; and a reception device including an embedded decoder configured to the 11-bit transfer data packet, received from the transfer device through an interface circuit, as the 10-bit original data packet, wherein the embedded encoder sets a case delimiter in the 11-bit transfer data packet through bit extension from 10 bits to 11 bits and sets, to 5, a maximum run length representing a number of consecutive repetitions of 0 or 1 in at least one transfer data packet, and the embedded decoder decodes the 11-bit transfer data packet as the 10-bit original data packet with reference to the case delimiter.

2. The data interface device of claim 1, wherein the embedded encoder sets, to 8:3, a maximum direct current (DC) balance representing a relative ratio of 0 and 1 in the 11-bit transfer data packet, through bit extension from the 10 bits to the 11 bits.

3. The data interface device of claim 1, wherein the embedded encoder performs encoding such that each of upper 3 bits and lower 4 bits is not continuous 0 or 1, in the 11-bit transfer data packet.

4. The data interface device of claim 3, wherein the embedded encoder performs encoding such that middle 6 bits overlapping at least one of some of the upper 3 bits and some of the lower 4 bits are not continuous 0 or 1, in the 11-bit transfer data packet.

5. The data interface device of claim 1, wherein the embedded encoder encodes at least some of upper 3 bits and at least some of lower 4 bits as the case delimiter, in the 11-bit transfer data packet.

6. The data interface device of claim 5, wherein the 10-bit original data packet comprises S[9:0] and the 11-bit transfer data packet comprises E[10:0], and the embedded encoder sets a first case delimiter in the transfer data packet based on a first case where upper 3 bits S[9:7] of the 10-bit original data packet are continuous 0 or 1, sets a second case delimiter in the transfer data packet based on a second case which is not the first case and where one of middle 4 bits S[6:3] and middle and lower 6 bits S[5:0] of the 10-bit original data packet is continuous 0 or 1, sets a third case delimiter in the transfer data packet based on a third case including all of the first case and the second case, and sets a fourth case delimiter in the transfer data packet based on a fourth case where all of the first case, the second case, and the third case are excluded.

7. The data interface device of claim 6, wherein the first case delimiter set in the transfer data packet is E[0]=E[2], E[1]≠E[2], and E[8]≠E[9].

8. The data interface device of claim 7, wherein the embedded encoder copies S[0] of the 10-bit original data packet to encode as E[10] of the transfer data packet, copies S[1] of the 10-bit original data packet to encode as E[0] of the transfer data packet, inverts S[1] of the 10-bit original data packet to encode as E[1] of the transfer data packet, copies S[7:1] of the 10-bit original data packet to encode as E[8:2] of the transfer data packet, and inverts S[8] of the 10-bit original data packet to encode as E[9] of the transfer data packet.

9. The data interface device of claim 8, wherein with reference to the first case delimiter, the embedded decoder copies E[10] of the transfer data packet to decode as S[0] of the 10-bit original data packet, copies E[7:2] of the transfer data packet to decode as S[6:1] of the 10-bit original data packet, and copies E[8] of the transfer data packet to decode as S[9:7] of the 10-bit original data packet.

10. The data interface device of claim 6, wherein the second case delimiter set in the transfer data packet is E[0]=E[2] and E[1]=[2].

11. The data interface device of claim 10, wherein the embedded encoder copies S[0] of the 10-bit original data packet to encode as E[4] of the transfer data packet, copies S[1] of the 10-bit original data packet to encode as E[5] of the transfer data packet, copies S[2] of the 10-bit original data packet to encode as E[3] of the transfer data packet, inverts S[2] of the 10-bit original data packet to encode as E[2:0] of the transfer data packet, inverts S[5] of the 10-bit original data packet to encode as E[6] of the transfer data packet, and copies S[9:6] of the 10-bit original data packet to encode as E[10:7] of the transfer data packet.

12. The data interface device of claim 11, wherein with reference to the second case delimiter, the embedded decoder copies E[4] of the transfer data packet to decode as S[0] of the 10-bit original data packet, copies E[5] of the transfer data packet to decode as S[1] of the 10-bit original data packet, copies E[3] of the transfer data packet to decode as S[2] of the 10-bit original data packet, inverts E[6] of the transfer data packet to decode as S[5:3] of the 10-bit original data packet, and copies E[10:7] of the transfer data packet to decode as S[9:6] of the 10-bit original data packet.

13. The data interface device of claim 6, wherein the third case delimiter set in the transfer data packet is E[0]=E[2], E[1] E[2], and E[8]=E[9].

14. The data interface device of claim 13, wherein the embedded encoder copies S[0] of the 10-bit original data packet to encode as E[4] of the transfer data packet, copies S[1] of the 10-bit original data packet to encode as E[0] of the transfer data packet, inverts S[1] of the 10-bit original data packet to encode as E[1] of the transfer data packet, copies S[1] of the 10-bit original data packet to encode as E[2] of the transfer data packet, copies S[2] of the 10-bit original data packet to encode as E[3] of the transfer data packet, copies S[4] of the 10-bit original data packet to encode as E[5] of the transfer data packet, inverts S[5] of the 10-bit original data packet to encode as E[6] of the transfer data packet, copies S[8:6] of the 10-bit original data packet to encode as E[9:7] of the transfer data packet, and inverts S[9] of the 10-bit original data packet to encode as E[10] of the transfer data packet.

15. The data interface device of claim 14, wherein with reference to the third case delimiter, the embedded decoder copies E[4] of the transfer data packet to decode as S[0] of the 10-bit original data packet, copies E[3:2] of the transfer data packet to decode as S[2:1] of the 10-bit original data packet, inverts E[6] of the transfer data packet to decode as S[5:3] of the 10-bit original data packet, copies E[7] of the transfer data packet to decode as S[6] of the 10-bit original data packet, and copies E[8] of the transfer data packet to decode as S[9:7] of the 10-bit original data packet.

16. The data interface device of claim 6, wherein the fourth case delimiter set in the transfer data packet is E[0]≠E[2].

17. The data interface device of claim 16, wherein the embedded encoder copies S[0] of the original data packet to encode as E[1] of the transfer data packet, copies S[1] of the 10-bit original data packet to encode as E[2] of the transfer data packet, inverts S[1] of the 10-bit original data packet to encode as E[0] of the transfer data packet, and copies S[9:2] of the 10-bit original data packet to encode as E[10:3] of the transfer data packet.

18. The data interface device of claim 17, wherein the embedded decoder copies E[10:1] of the transfer data packet to decode as S[9:0] of the 10-bit original data packet with reference to the fourth case delimiter.

19. The data interface device of claim 6, wherein the transfer data packet comprises a training packet transferred in a packet training period, a blank packet transferred in a first period succeeding the packet training period, a control packet transferred in a second period succeeding the first period, and an image data packet transferred in a third period succeeding the second period.

20. The data interface device of claim 19, wherein the embedded encoder sets the fourth case delimiter in each of the training packet, the blank packet, and the control packet, and the embedded encoder sets one of the first to fourth case delimiters in the image data packet.

* * * * *